United States Patent [19]

Thompson

[11] Patent Number: 5,269,283
[45] Date of Patent: Dec. 14, 1993

[54] EMISSION CONTROL DEVICE FOR FUEL INJECTION AND CARBURETED ENGINES

[75] Inventor: Richard W. Thompson, Tujunga, Calif.

[73] Assignee: Thompson Technologies, Inc., Glendale, Calif.

[21] Appl. No.: 755,059

[22] Filed: Sep. 5, 1991

Related U.S. Application Data

[63] Continuation-in-part of Ser. No. 583,876, Sep. 14, 1990, Pat. No. 5,046,475.

[51] Int. Cl.⁵ ............................................. F02B 23/00
[52] U.S. Cl. .................................... 123/585; 123/587
[58] Field of Search ...................... 123/585, 587, 590; 48/189.3, 189.6; 261/64.1, DIG. 1

[56] References Cited

U.S. PATENT DOCUMENTS

| 1,549,624 | 8/1925 | Stransky | 123/587 |
| 1,870,411 | 8/1932 | Horscroft | 123/587 |
| 3,077,391 | 2/1963 | Guffra | 123/590 |
| 3,834,367 | 9/1974 | Dalerta | 123/585 |
| 4,137,875 | 2/1979 | Medina | 123/585 |
| 4,215,663 | 8/1980 | Gaylord | 123/590 |
| 4,232,645 | 11/1980 | Shiber | 123/590 |
| 4,355,623 | 10/1982 | Graham | 123/585 |
| 4,362,143 | 12/1982 | Fukumoto | 123/587 |
| 4,373,500 | 2/1983 | Haynes | 123/587 |
| 4,445,466 | 5/1984 | Zaita et al. | 123/579 |

FOREIGN PATENT DOCUMENTS 511369 9/1971 Switzerland.

Primary Examiner—Noah P. Kamen
Attorney, Agent, or Firm—Ladas & Parry

[57] ABSTRACT

Disclosed herein is an emission control device for use with a carburetor or fuel injection engine. The device is comprised of a body member of predetermined thickness and may define therein at least one through opening. The through opening communicates with the fuel opening in the carburetor or the fuel injection body. The device also has an air passageway largely defined in its surface. The air passageway communicates with the through opening and lies generally under the fuel passageways of the carburetor or injection body so that air passed through the passageway passes into the through opening and under the fuel passageways.

27 Claims, 14 Drawing Sheets

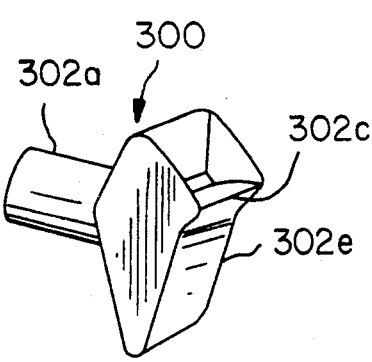
FIG. 14
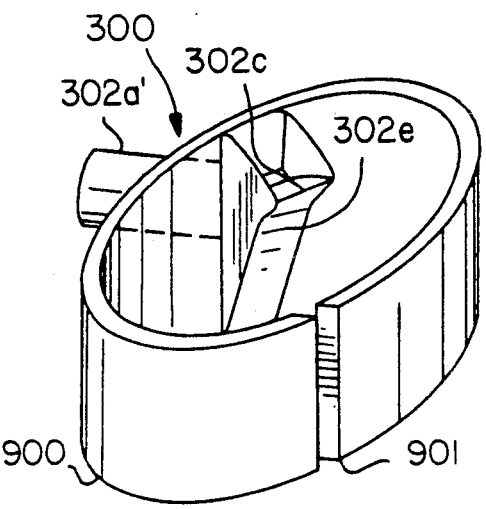
FIG. 15
FIG. 16
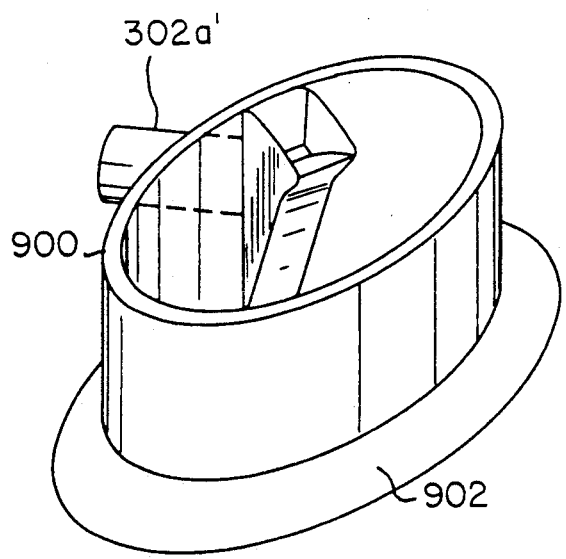
FIG. 18A
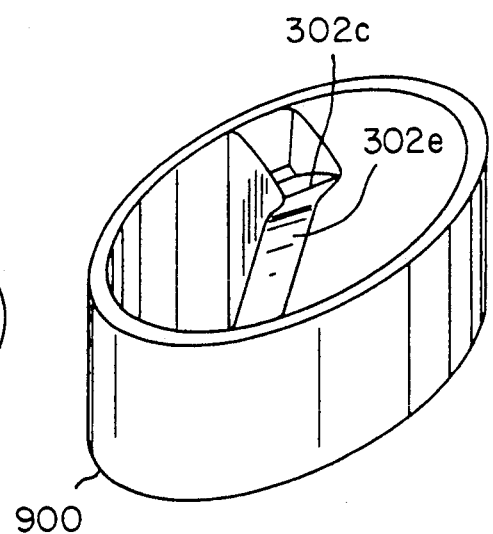

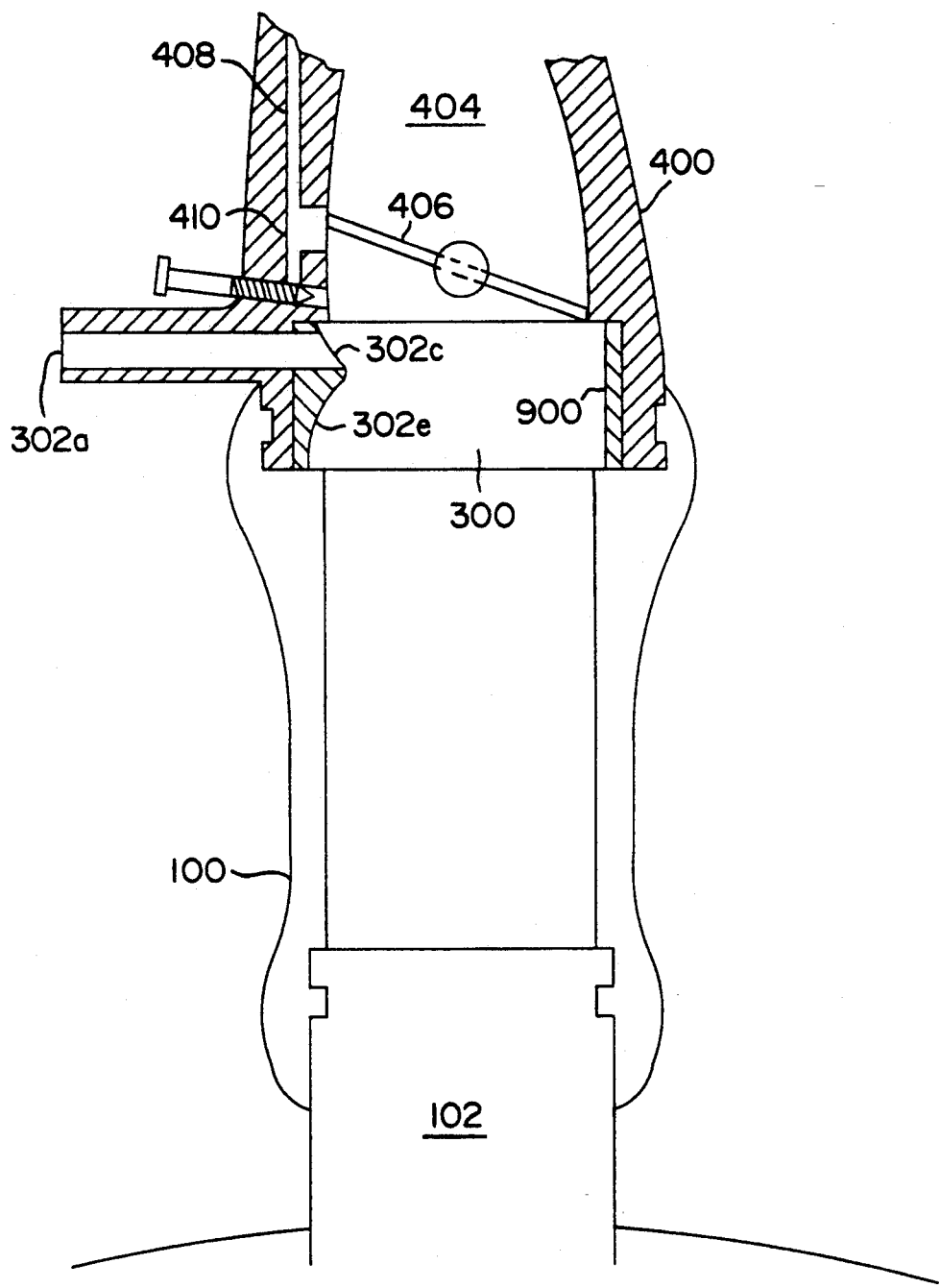

EMISSION CONTROL DEVICE FOR FUEL INJECTION AND CARBURETED ENGINES

RELATED APPLICATIONS

This is a continuation-in-part of U.S. Ser. No. 583,876 filed on Sep. 14, 1990, now U.S. Pat. No. 5,046,475.

BACKGROUND OF THE INVENTION

The present invention relates to an auxiliary device for use between a carburetor and an intake manifold of an internal combustion engine or for use with fuel injection engines below or above the throttle. While the invention is shown in many of the figures as an auxiliary device, in fact, the carburetor or the fuel injection system may be manufactured to include the invention.

Fuel saver devices for use with internal combustion and fuel injection engines are well known in the art. Below is a list of representative patents.

U.S. Pat. No. 4,373,500 issued to Haynes on Feb. 15, 1983.
U.S. Pat. No. 2,064,693 issued to Shaver on Nov. 1, 1934.
U.S. Pat. No. 1,527,776 issued to Bliffert on Jun. 1, 1923,
U.S. Pat. No. 1,501,196 issued to Bliffert on Jul. 15, 1924.
U.S. Pat. No. 3,834,367 issued to Dalerta on Sep. 10, 1974.
U.S. Pat. No. 1,870,411 issued to Horscroft on Aug. 9, 1932
U.S. Pat. No. 1,581,461 issued to McKeever on Apr. 20, 1926.
U.S. Pat. No. 1,549,624 issued to Stransky on Aug. 11, 1925.
U.S. Pat. No. 3,437,467 issued to Jacobus on Apr. 8, 1969.
U.S. Pat. No. 4,362,143 issued to on Fukumoto Dec. 7, 1982.
U.S. Pat. No. 3,561,409 issued to August on Feb. 9, 1971.
U.S. Pat. No. 3,494,341 issued to Serruys on Dec. 29, 1967.
U.S. Pat. No. 4,355,623 issued to Graham on Oct. 26, 1982.
U.S. Pat. No. 4,137,875 issued to Medina on Feb. 6, 1979.
U.S. Pat. No. 3,996,315 issued to Herail on Dec. 7, 1976.
U.S. Pat. No. 3,973,534 issued to Amos on Aug. 10, 1976.
U.S. Pat. No. 3,946,710 issued to Albano on Mar. 30, 1976.
U.S. Pat. No. 3,943,900 issued to Primrose on Mar. 16, 1976.
U.S. Pat. No. 3,414,242 issued to Bouteleux on Dec. 3, 1968.
U.S. Pat. No. 2,377,852 issued to Bliffert on Jun. 12, 1945.
U.S. Pat. No. 1,942,187 issued to Ruffino on Jan. 2, 1934.
U.S. Pat. No. 1,748,203 issued to Brunelle on Feb. 25, 1930.
U.S. Pat. No. 1,118,865 issued to Johnston and Cooper on Nov. 24, 1914.

From the foregoing list two patents are believed to be the most pertinent with respect to the present invention. These are U.S. Pat. No. 4,373,500 to Haynes and U.S. Pat. No. 4,355,623 to Graham. The Haynes patent discloses an emission control device for carbureted engines. The device contains a plurality of openings which communicate with a through opening. Positioning of the openings with respect to the fuel port of the carburetor is optional. The Graham patent discloses an auxiliary device which is to be placed between the carburetor and the manifold of an engine. The device has a central opening which corresponds in size to the manifold and carburetor openings. In communication with the central opening are two air inlet lines which pass through the body of the auxiliary device and open at a 45 degree angle to the central opening of the auxiliary device. The air inlet openings communicate with yet other openings that pass through the body of the auxiliary device and carry therein a threaded member. The air passing through the openings in the body into the central opening impinges against the threaded members to create a turbulent condition. The turbulence is intended to cause unhomogenized droplets of fuel to break up and disperse throughout the existing mixture.

SUMMARY OF THE INVENTION

Disclosed herein is a fuel injection body or a carburetor having a base defining an opening of a first width; a fuel port in fluid communication with said opening; and having at said base an emission control device, said device comprising at least one through opening of a second width, said second width being greater than said first width, said through opening communicating with said opening in said fuel injection body or carburetor, said emission control device also having an air passageway, said air passageway communicating with said second opening and opening into said second opening under said fuel port.

BRIEF DESCRIPTION OF THE DRAWINGS

The present invention may be better appreciated when discussed with respect to the following drawings.

FIG. 14 is a perspective view of the device of FIG. 12.

FIGS. 15 and 16 show mounting means for the device of FIG. 12.

FIGS. 18a and 18b shows a mounting means for the device of FIG. 12 and its placement within an engine.

DESCRIPTION OF THE PREFERRED EMBODIMENTS

Figure 1:
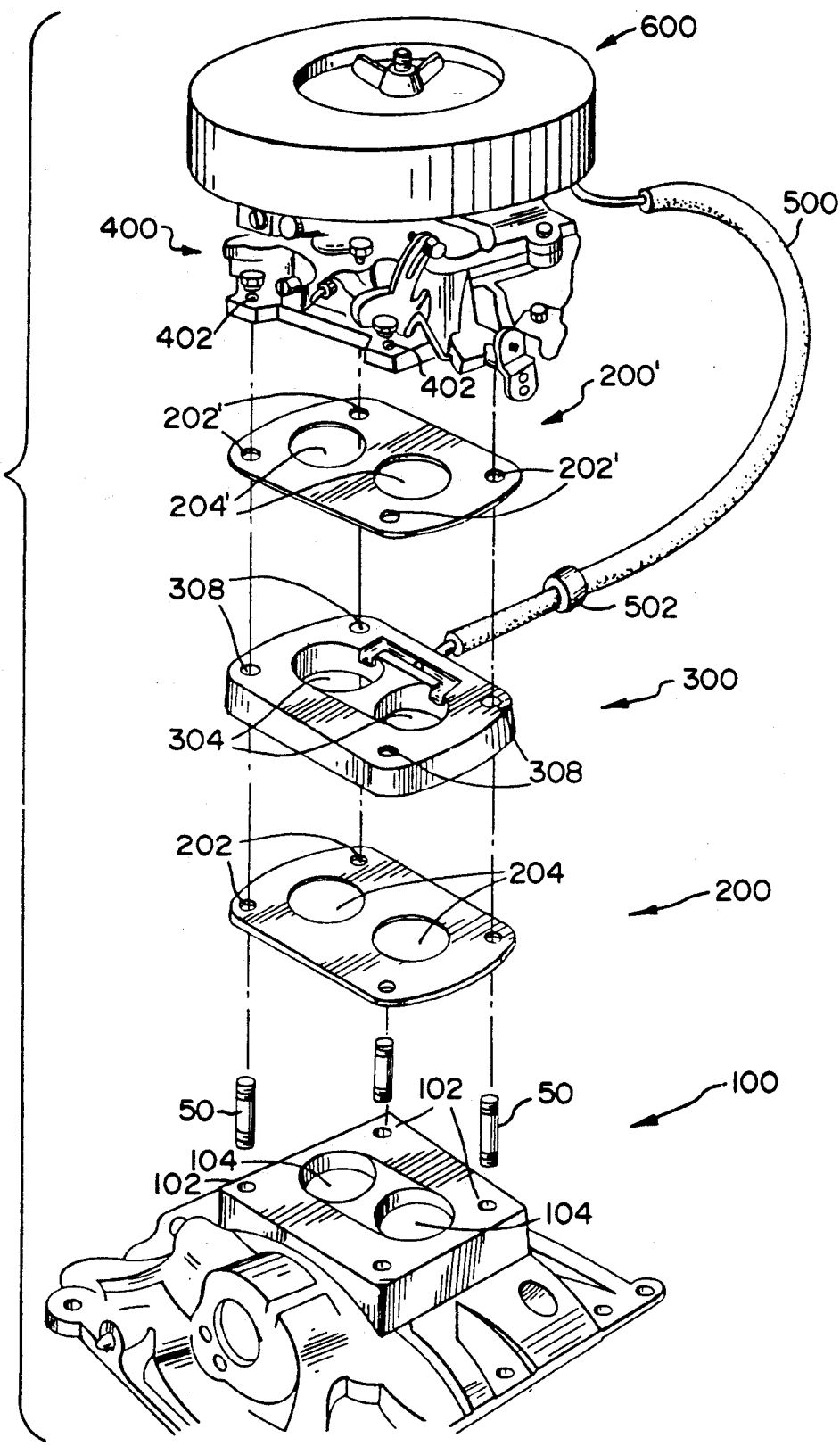
FIG. 1 is an exploded view of a two barrel, single stage, internal combustion engine with the present invention inserted therein.

In FIG. 1, an exploded view of an internal two barrel, single stage, combustion engine is shown. A standard engine intake manifold 100 having a top surface with two through openings 104 located generally centrally therein is at the base of FIG. 1. Four corners surround through openings 104 and define therein connecting holes 102.

Fitted on top of intake manifold 100 is first gasket 200. First gasket 200 contains two through openings 204 which are generally centrally located in first gasket 200 and are surrounded by four connecting holes 202. Connecting holes 202 are near and within the corners of first gasket 200. It will be appreciated that when first gasket 200 is fitted against the top surface of manifold 100, through openings 104 and 204 register with each other as do connecting holes 102 and 202.

The present invention, emission control device 300, is fitted on top of first gasket 200. Emission control device 300 defines generally centrally within its body two through openings 304. These will register with through openings 204 of first gasket 200. Around through openings 304 and generally at the corners of emission control device 300 are connecting holes 308. Connecting holes 308 will register with connecting holes 202 when emission control device 300 is placed against first gasket 200.

Second gasket 200' is fitted on top of emission control device 300. It is essentially the same in shape as first gasket 200. When emission control device 300 and second gasket 200' are placed adjacent to one another, the through openings 204' and connecting holes 202' of second gasket 200' register with the through openings 304 and connecting holes 308 respectively, of emission control device 300.

Above second gasket 200' is two-barrel carburetor 400. Carburetor 400 defines in its base connecting holes 402 which register with connecting holes 202' of second gasket 200'. With the connecting holes of all parts registering as described above, pin 50 can be passed through all of the connecting holes to hold in serial relationship manifold 100, first gasket 200, emission control device 300, second gasket 200', and carburetor 400. When this is done, all of the through holes 104, 204, 304, 204' are in fluid communication with each other and openings 404 of carburetor 400.

Above carburetor 400 is air cleaner 600 which connects to carburetor 400 in a known fashion. Emission control device 300 is connected to air cleaner 600 by means of tubing 500 and needle or other valve 502 so that air from air cleaner 600 is directly fed into emission control device 300.

Figure 2:
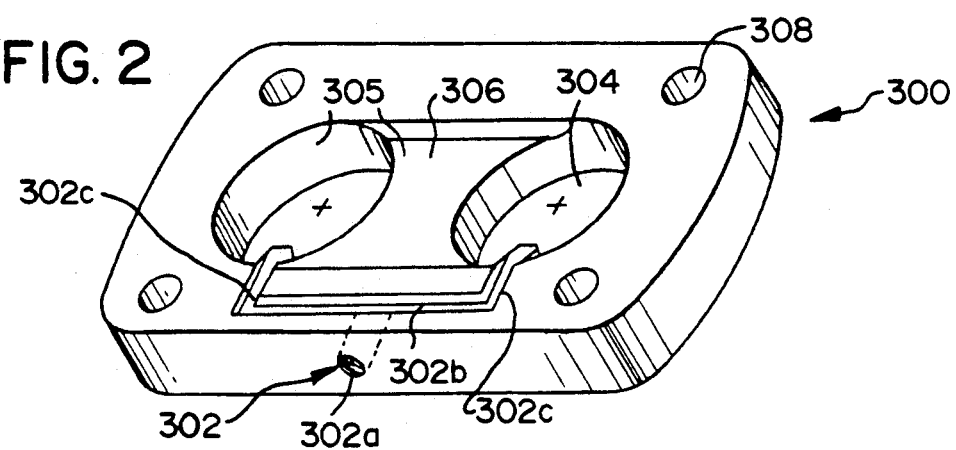
FIG. 2 is an enlarged perspective view of a first embodiment of the present invention.

Emission control device 300 is shown in detail in FIG. 2. It is generally rectangular in shape and has an upper surface which defines therein indentations having sides and a base. These indentations are air passageways 302 and 306. Air passageways 302 and 306 are in fluid communication with the two through holes 304. The sides of air passageways 302 and 306 may be angled, or curved as they meet their base. Through holes 304 are symmetrically arranged with respect to the edges of emission control device 300 and pass completely therethrough. The combination of through holes 304 and air passageway 306 is centrally located within emission control device 300.

Air passageway 302 is comprised of three sections 302a, 302b, and 302c which are in fluid communication with each other. The first section, central outside communication bore 302a, is carved into an edge of emission control device 300 and extends at right angles thereto. It therefore does not begin initially as an indentation but as a bore which later rises to the surface of emission control device 300 to become an indentation therein and a part of the second section, 302b. Central outside communication bore 302a lies in the middle of section 302 and extends at a right angle from second section 302b. It lies between through openings 304 and generally centrally of air passageway 306. The inside walls of central outside communication bore 302a may be threaded to connect with connecting means which place it in fluid communication with tubing 500 and thus air cleaner 600. On the other hand, bore 302a may include a cast-in boss for receiving and holding tubing 500 or may extend out of emission control device 300 to act as a neck 302a' *(FIG. 12 is illustrative of this).*

The second section of air passageway 302 is section 302b, which extends longitudinally and in parallel with the edge of emission control device 300. It is defined in the surface of emission control device 300 as an indentation and is spaced from the edge of emission control device 300, through openings 304 and air passageway 306.

Breaking away at right angles from section 302b is the third section of 302, outlets 302c. Outlets 302c are in fluid communication with through openings 304 and are also generally indentations in the surface of emission control device 300. Outlets 302c are directed toward the central axis "+" of through openings 304. They are shown in FIG. 2 to preferably protrude into through openings 304. In FIG. 2 outlets 302c have squared ends with upper sides which angle away from these ends toward and increase in height as they approach the walls which define through openings 304. In the drawings, the ends of outlet 302c are of the same width as that portion of outlet 302c which is defined in the surface of emission control device 300. It may be desirable however as throttle diameters increase to cause that portion of outlet 302c which extends into through opening 304 to be of a greater width. Thus there would be an abrupt increase in width at the point that outlet 302c begins its extension into through opening 304 and this increased width would continue to the end of outlet 302c.

It can now be appreciated that air passageways 302b, 302c and 306 are formed in the surface of emission control device 300 causing the surface level to drop at these points. Bore 302a must be centrally located with respect to sections 302b and 302c so that sections 302b and 302c are symmetrically arranged with respect to bore 302a. Section 302b does not need to extend in parallel with the edge of emission control device 300 nor at a right angle with respect to openings 302a. As noted above, sections 302c need not lie at right angles to section 302b. It is only important that sections 302c be directed in a horizontal or upward direction toward the central axis + of through openings 304.

The cross sectional area of each of outlets 302c is less than the cross sectional area of each of bore 302a and air passageway 302b. The cross sectional area of bore 302a must be greater than that of one outlet 302c. The same is true with respect to section 302b. It must have a cross sectional area that is greater than that of one outlet 302c.

Returning to FIG. 2, air passageway 306 lies between through openings 304. It is physically separate from air passageway 302 and is preferably equal in width to the diameters of through openings 304. Air passageway 306 could however be designed with a lesser width. The depth of air passageway 306 is the same as the depth of air passageway 302. However, equivalence of depth is not required.

Figure 3:
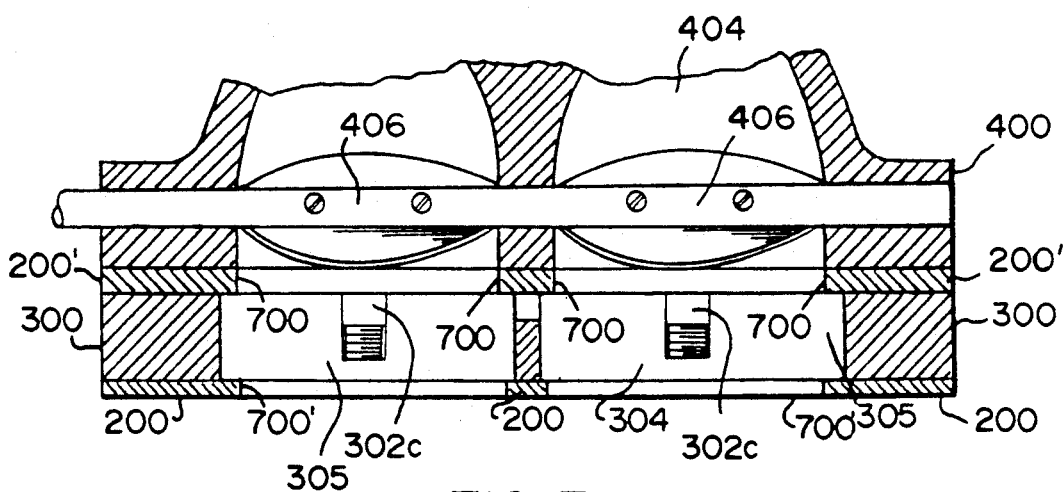
FIG. 3 is a sectional and diagrammatic view taken through the present invention, a portion of a carburetor, and a first and second gasket.

The diameter of each through hole 304 is greater than the diameter of each carburetor opening 404 and each second gasket through opening 202'. It is also greater than each of the openings 204, 104 in the first gasket 200 and the manifold 100, respectively. FIG. 3 discloses this relationship.

In FIG. 3, a sectional and diagrammatic view of the interrelationship between emission control device 300, carburetor 400, and first and second gaskets 200 and 200' is shown. Because of the increased diameter of through opening 304 as compared to that of carburetor opening 404 and that of through opening 202' defined in second gasket 200', a ledge 700 is formed. This ledge is formed by the walls of second gasket 200', and carburetor 400 which define through openings 202' and 404 respectively. A similar ledge 700', is created between the through opening 304 in emission control device 300 and through opening 202 in first gasket 200.

FIG. 3 also shows throttle 406 in carburetor 400 as located within opening 404. Throttle 406 lies above through openings 202' and 304 of second gasket 200' and emission control device 300 respectively. Throttle 406 is in its usual position with the upper side facing the fuel ports 408, 410 and outlet 302c.

Figure 4:
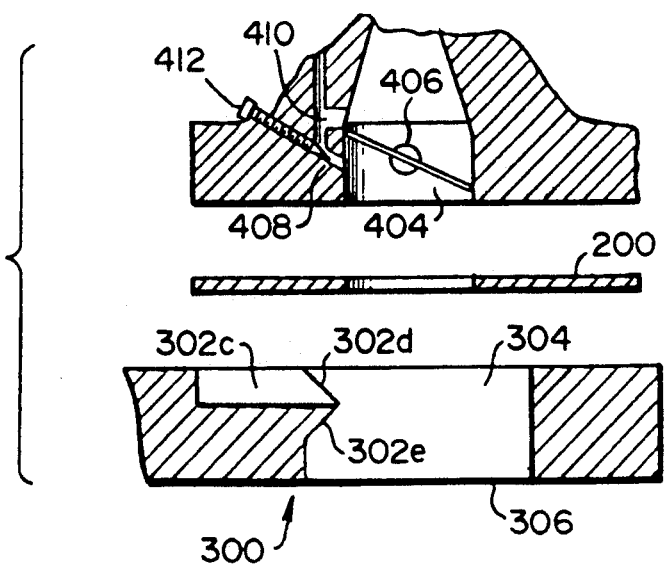
FIG. 4 is an exploded sectional diagrammatic view of the present invention as taken through one carburetor opening and one through opening and an outlet of the invention.

FIG. 4 is an exploded and partially diagrammatic view of a section through outlet 302c, one through opening 304, gasket 200, carburetor 400, and carburetor opening 404. In the forming of emission control device 300 with outlet 302c extending into opening 304, each of the side walls form an upper side lip 302d. A lower full lip 302e extends from the base end of outlet 302c downwardly and back toward the walls which define through opening 304.

Upper side lip 302d extends from the end of the side of the base of outlet 302c and angles upwardly toward or to the sides which define the outer edge of through opening 304. It therefore forms one side of a triangle when viewed as in FIG. 4 angling from the end of the base of outlet 302c toward the top surface of 300 and the inner wall which defines through opening 304. While a sharp angle is shown in FIG. 4, the side lip 302d could instead curve in its descent from the upper surface of 300 to the end of the base of outlet 302c. Upper side lip 302d and the end of outlet 302c preferably extend far enough into through opening 304 to align with the side edges which define opening 404 in carburetor 400. However, they may extend further toward the center of opening 404. While the formation of upper side lips 302d is preferable, it is not mandatory. It is believed that upper side lips 302d help to direct the fuel in a low vacuum condition in the engine. It is also believed that upper side lips 302d facilitate directing the air flow directly under the fuel flow and into the airflows of 304.

Below upper side lip 302d is lower full lip 302e. Lower full lip 302e extends from the end of the base of outlet 302c and curves or angles toward the sides which define through opening 304. In cross section, as shown in FIG. 4, it is generally triangular in shape. Its inclusion is not mandatory. But if included, it preferably curves in its joinder of the base of 302c to the inside wall of opening 304 (FIG. 12 shows such curvature).

Also seen in FIG. 4 in carburetor 400, is mid-speed fuel air port 410 and idle port 408 which communicate with and are to the side of opening 404. Located within port 408, is idle adjusting screw 412 which works with ports 408, 410, opening 400, and throttle 406 in a known manner.

The present invention functions as follows. Air is brought into air cleaner 600, passes into air filter line 500 and through needle valve 502. From needle valve 502, it enters bore 302a and passes through air passageway 302b and out outlets 302c into through openings 304 and across air passageway 306 which is believed to cause a pulsing of sorts between outlets 302c. Because air passageways 302 and 306 are formed in the surface of emission control device 300 (with the exception of bore 302a) they are separated from carburetor 400 only by second gasket 200'. This enables air to come out immediately under the base of carburetor 400 and closest to ports 408, 410. This is important in view of the fact that the throttle 406 of a carburetor is at its base and that the idle port 408 and mid-speed fuel-air port 410 (FIG. 4) have air/fuel flows which are at and immediately below the throttle 406. The closer emission control device 300 outlet 302c is to the fuel flowing from ports 408, 410, the more effective the device is in maximizing the amount of fuel burned, reducing the amount of toxic emissions, and providing a more rapid throttle response. This is because the fuel is mixed with the air immediately as it exits into the air stream. In prior art systems, there is a greater time delay before such mixing occurs because the air passages are either not on the surface of the device or are not located directly under the fuel air port. (The foregoing discussion pertains to steady throttle states and slow to rapid throttle movement as vacuum and air flow vary.) It is therefore significant that outlets 302c be preferably directly under the fuel ports 408, 410, of carburetor 400. Outlet 302c needs to come directly under the idle and mid speed fuel air ports 408, 410 where the fuel comes out so that the fuel which is hugging the wall, that did not go into the air stream, is lifted off the walls. This is facilitated by the protrusion of outlet 302c into through opening 304, by the fact that through opening 304 is of greater diameter than through opening 202' and opening 404, and by the inclusion of air passageway 306 through which air is pulsed and a vacuum effect is created. In a preceding paragraph it was stated that the end of outlet 302c should extend into through opening 304 far enough to at least align with the side edges which define opening 404. However, it is within the contemplation of this invention that outlet 302c could extend beyond this point into through opening 304 and in fact such further extension is generally preferred. However, in engines used for race cars, outlet 302c may be limited to extending only to that point in through opening 304 which aligns with the walls that define opening 404. Despite, this restriction, outlet 302c, the greater diameter of through opening 304 with respect to openings 202' and 404 and the inclusion of air passageway 306 will still act to reduce toxic emissions. The positioning of air outlets 302c will vary depending upon the carburetor used in order to place outlets 302c directly under fuel passages 408, 410 of a specific brand and model. Further, and as noted above, outlets 302c have to exit in line with and be directed toward the central axis + of through openings 304. However, outlets 302c could angle upwardly toward openings 404 as they are directed toward the central axis + of through openings 304. It is merely preferred that they do not angle away, that is downwardly from openings 404. Outlets 302c are shown in the drawings as parallel to the upper surface of emission control device 300. It is preferred that there be no turbulence or obstruction (or reduction in cross sectional area) which would affect the air flow between valve 502 and outlets 302c. It is preferred that between valve 502 and outlets 302c the only vacuum drop which occurs be at valve 502 and outlets 302c. Outlet 302c thus, should preferably be the smallest cross-sectional area in the area which is defined in the upper surface of emission control device 300 at that point which joins the walls which define through openings 304, with outlet 302c being tapered at that point to form a venturi. With this clear and unobstructed opening into through openings 304, it is believed that the air passes into through openings 304 with the highest amount of velocity. Trying to cause turbulence at the air opening with threaded members or blade tips, is not desired as it is believed that turbulence diminishes the effectiveness of the device. When speaking of 302c's smallest cross sectional area, the area being discussed is the end and near end of passageway 302 where it enters into through openings 304.

It is important that outlets 302c are distanced equally from bore 302a and from the center of air passageway 306. This is because of the air pulsations that occur between through holes 304 by means of air passageway 306. These air pulsations occur as the intake valves in the cylinder head, or heads of the engine open and close. This pulsing vacuum effect is believed to lift at least some of the fuel off the walls of opening 404 and through opening 402.

Outlets 302c must be under the idle port 408 and off idle (mid speed) port 410 of the carburetor. Preferably, outlets 302c are an eighth of an inch or less away from the idle ports 408, 410 although they could be located at greater distances. However the closer outlets 302c are to idle ports 408, 410, the better and more effective is the device in reducing emissions by facilitating the more complete burning of all fuel flowing through opening 404. Second gasket 200' prevents passages 302a, 302b, and 302c from contacting the bottom surface of carburetor 400. However second gasket 200' is thin enough to allow emission device 300 to be as close as possible to the carburetor 400. Second gasket 200' could be omitted by forming carburetor 400 with emission control device 300. Then, outlets 302c could be placed closer to fuel ports 410, 408.

The diameters of through openings 304 are greater than the diameters of openings 404 in carburetor 400. This was discussed with respect to and shown in FIG. 3. Preferably, the diameter of through opening 304 is at least 1/5 of an inch larger than the diameter of opening 404 of carburetor 400. This is to create a cavity 305 between each through hole 304 and the gaskets 200, 200' and the carburetor 400 and manifold 100. It also forms ledges 700 and 700'. If emission control device 300 were formed as a part of carburetor 400, then in machining, molding or die casting the two together, the ledge 700 could still be formed. It is believed that by having ledge 700 between the carburetor 400 and the emission control device 300, the homogenization of the air/fuel mixture and unsuspended fuel is enhanced. Ledge 700 is also believed to facilitate variations in throttle position, engine load, vacuum changes and unsuspended fuel film which forms on the carburetor bore 404 from the accelerator pump discharge. If carburetor 400 is formed with emission control device 300, ledge 700 may or may not be included but preferably it is included.

Figure 9:
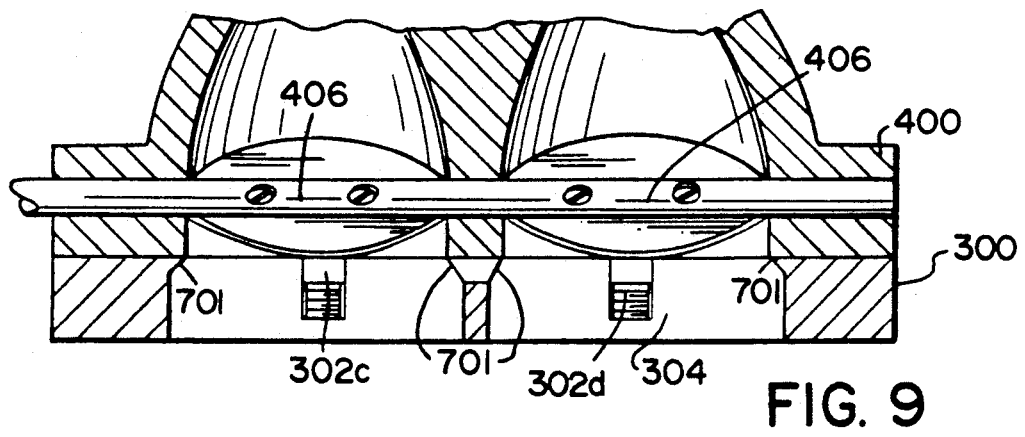
FIG. 9 is a modified version of the present invention.

In FIG. 9 a cross sectional view of a carburetor 400 formed with an emission control device 300 is shown. While ledge 700 is present in this drawing, it is shown to be triangular in form and is thus numbered 701 since it differs from ledge 700 earlier shown. It could as well take on a curved shape.

Figure 5:
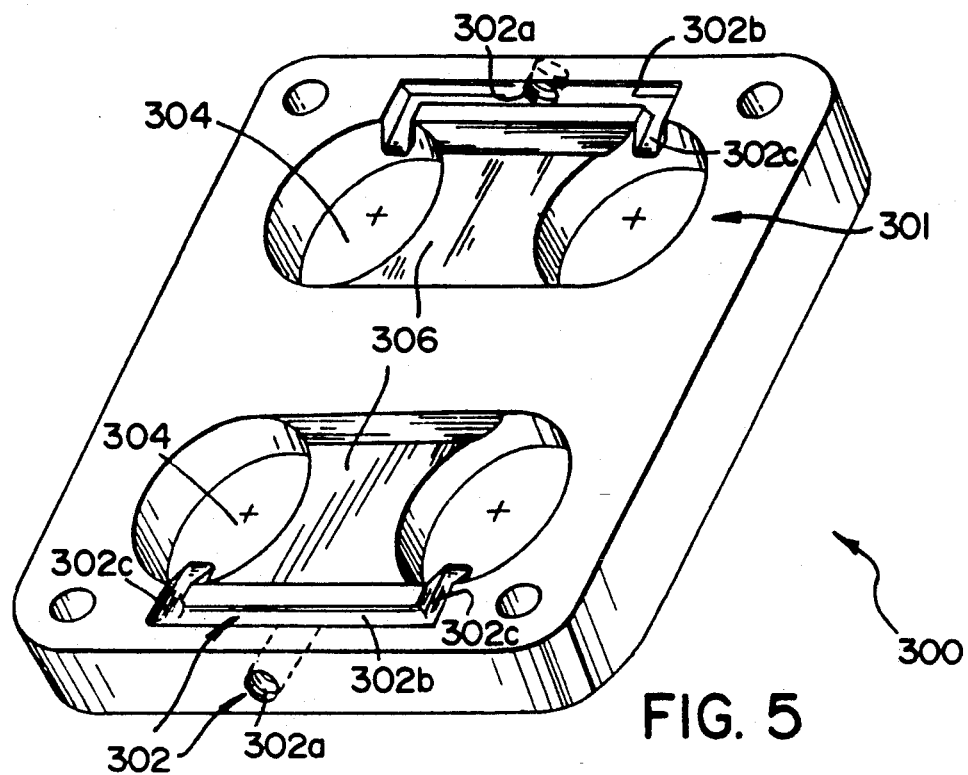
FIG. 5 is a perspective view of the present invention as modified for use with a four barrel carburetor with a secondary idle circuit.
Figure 6:
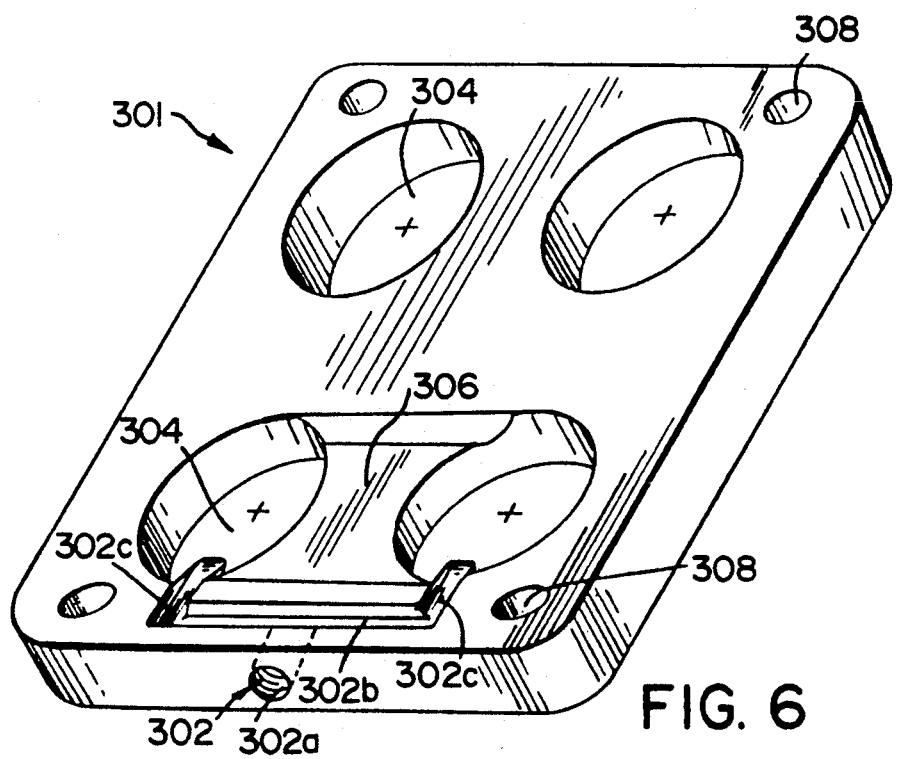
FIG. 6 is a perspective view of the present invention for use with a four barrel carburetor without a secondary idle circuit.

The foregoing invention is also applicable to single-barrel and four-barrel carburetor engines. To use the invention with certain older designed four-barrel carburetor engines, emission control device 300 would contain another set of through openings 304 connected to a second air passageway 306 and 302. In some older four-barrel engines, an idle circuit is built into the rear throttles. Less fuel flows through this idle circuit so a lesser amount of air would pass through through openings 302 in the secondary section 301. Nevertheless, the configuration of the present invention would merely be repeated in the secondary pair of throttle bores and this can be seen in FIG. 5. Newer four-barrel carburetors do not have secondary idle circuits and would therefore not necessarily need a repeat configuration on the secondary side. FIG. 6 is an example of an emission control device designed for such engines.

Figure 7:
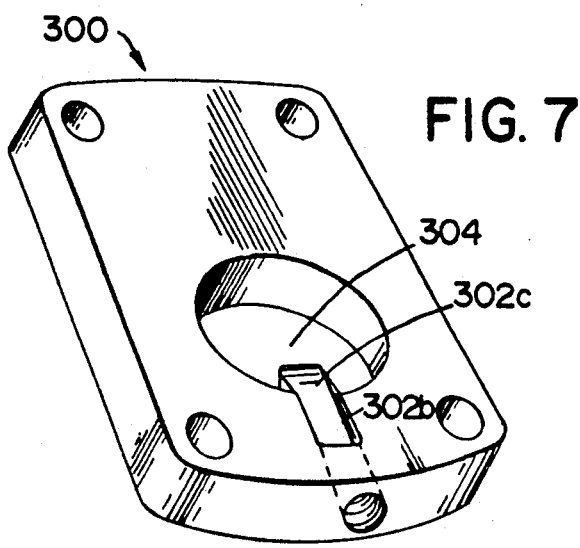
FIG. 7 is a perspective view of the present invention for use with a single throttle, single barrel carburetor.
Figure 8:
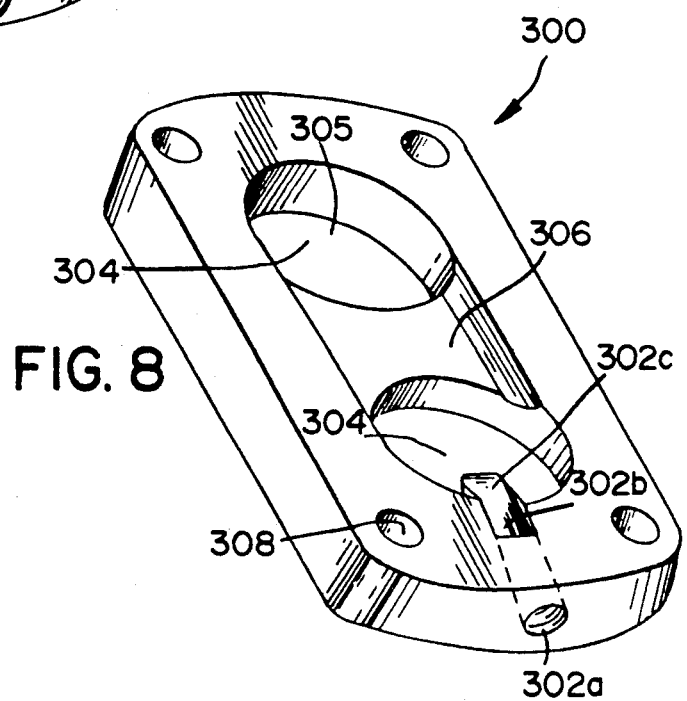
FIG. 8 is a perspective view of the present invention as modified for use with a two barrel, two stage carburetor.

In a single throttle or barrel carburetor engine, air passageway 306 would not be present. Opening 302 would merely pass into through opening 304 since that is the only through opening in the device. This is shown in FIG. 7. In a two-barrel, two-stage carburetor, passageway 306 would be present but air passageway 302b would not bifurcate into both openings. It would merely enter the top opening. FIG. 8 discloses this arrangement. This is because on the two-stage, two-barrel engine, there is only one idle fuel port but two throttles.

Emission control device 300 may be made of cast aluminum, other suitable metals, or suitable plastics. The advantage of using plastic or aluminum is the ability to die cast or injection mold the emission control device 300.

The present invention should not be connected to a PCV valve. It can be used with or without an EGR (Exhaust Gas Recirculation) plate normally placed underneath a carburetor.

In testing the present invention the following relationships were found most effective.

| 404 Diameter | 306 approx. Depth |
| --- | --- |
| 1" | .100–.150" |
| 1¼" | .150–.200" |
| 1½" | .200–.250" |
| 1¾" | .250–.300" |

Insufficient depth of air passageway 306 will reduce the effectiveness of the device by failing to maximize reduction of emissions. Too much depth reduces the effectiveness of the device by causing a lean condition during acceleration and/or increased loading on the engine. This too will reduce the effectiveness of the device.

| 404 diameter (in inches) | 302c approx. dimensions (in inches) |
| --- | --- |
| 1 | .1 × .175 |
| 1.25 | .2 × .2 |
| 1.5 | .25 × .25 |
| 1.75 | .3 × .3 |

If 302c is too small, it reduces the effectiveness of the device by choking the air flow off and or slowing its velocity. If 302c is too large it diminishes the speed of the air entering through opening 304. The foregoing dimensions for 302c can vary as much as 30% in either direction.

The present invention was found to reduce toxic emissions and increase fuel efficiency.

Figure 10:
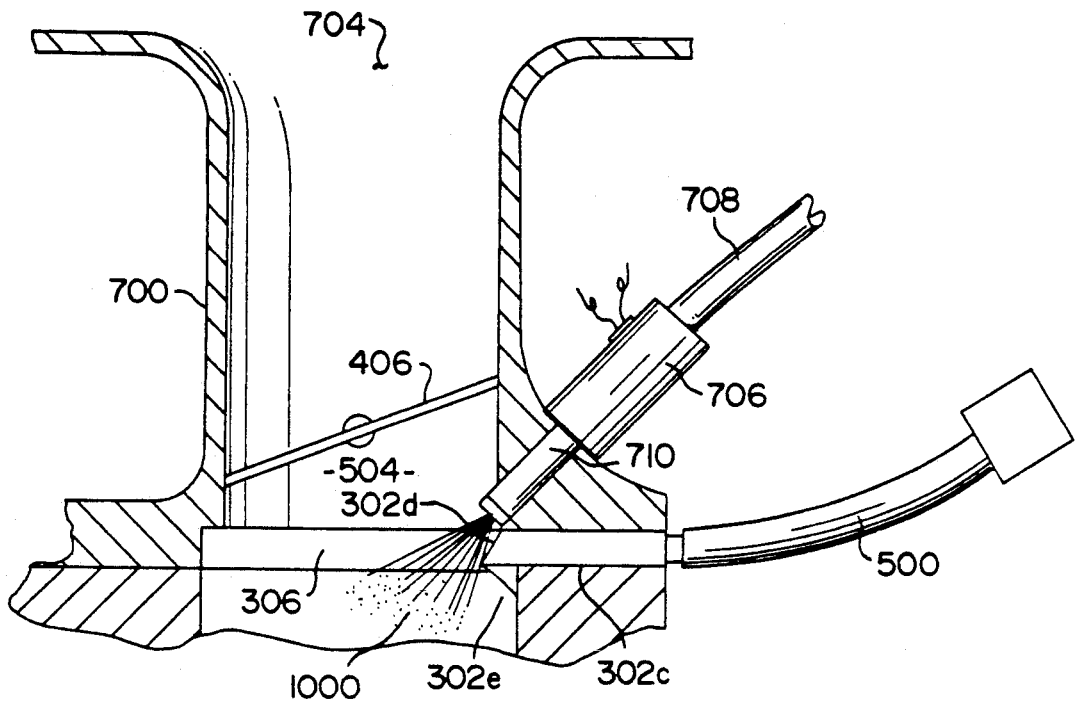
FIG. 10 is the present invention as generally disclosed in FIG. 1 but used with a fuel injection engine and situated below the throttle.

Turning now to FIGS. 10 and 11 the present invention is shown in a fuel injection engine. In view of the detailed discussion of the present invention in the preceding paragraphs, only significant differences will be discussed with respect to these drawings. Like parts have been assigned like reference numerals. It is understood that emission control device 300 can be modified as discussed above and that it can be used as an auxiliary device or its design directly manufactured into the engine.

FIG. 10 shows fuel injection body 700 defining opening 704 with throttle 406 contained therein. As is immediately understood, with a fuel injection system, a carburetor is no longer present and thus carburetor 400 and its opening 404 have been replaced by fuel injection body 700 and its opening 704.

Entering at an angle from the side of fuel injection body 700 into opening 704 and below throttle 406, is fuel injector 706. At an end outside of opening 704, fuel injector 706 attaches to fuel hose 708. At its opposite end, inside of opening 704, it attaches to spray nozzle 710. Fuel 1000 is diagrammatically shown spraying out of nozzle 710. Spray nozzles for fuel injectors are manufactured in various diameters and designs. In this particular instance, the smaller the diameter of the spray nozzle used, the better. With a smaller diameter nozzle, the fuel can be brought closer to outlet 302c of the device.

Below spray nozzle 710 and throttle 406, outlet 302c is seen, defined in emission control device 300 and connected to tubing 500. As in the previous drawings, outlet 302c preferably includes upper side lip 302d and lower full lip 302e and extends toward the center + of and into opening 306 of emission control device. It extends horizontally or it may angle upwardly. It should not angle downwardly, that is away from the spray nozzle 710 of fuel injector 706. If the emission control device 300 is incorporated into the fuel injection body 400, of course, no second gasket 200' is present. If the device is an auxiliary device, gasket 200 is present and the relationship of through opening 202 to through opening 304 and opening 404 in throttle injection body 700 will be the same as that described with respect to the carburetor and the earlier embodiments.

Figure 11A:
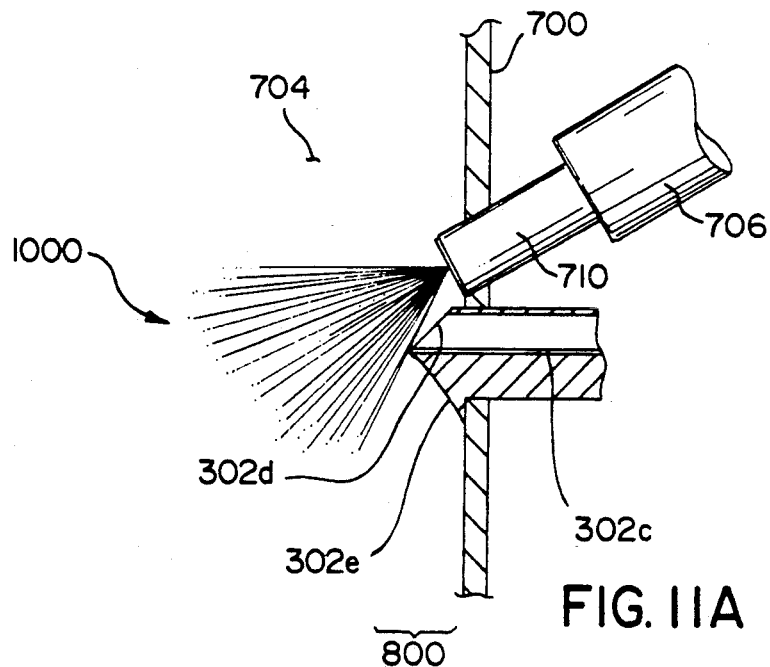
FIGS. 11a and 11b are an enlarged view of the fuel injector nozzle and the invention's outlet in the fuel injection body.
Figure 11B:
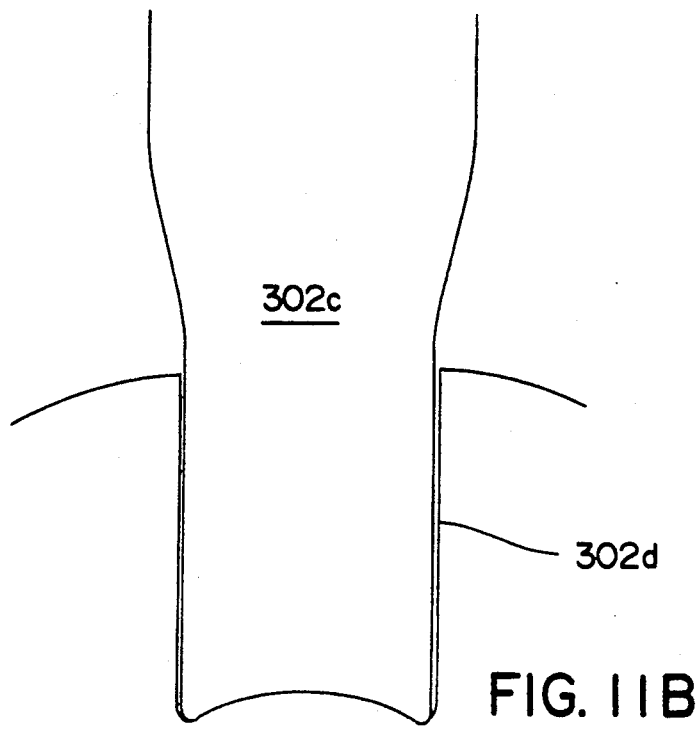

Because with a fuel injection system there is no idle and no midspeed fuel air ports 408, 410, outlet 302c must now be placed directly under spray nozzle 710. Stating that outlet 302c is directly under spray nozzle 710 only partially explains its positioning. Reference to FIG. 11a better depicts the location of 302c. In this figure, fuel spray 1000 is seen to diverge from spray nozzle 710. While one point of spray nozzle 710 is seen to be placed close to the inside wall of fuel injection body 400 defining opening 704, another point is spaced therefrom. This is because fuel injector 706 is placed in fuel injection body 700 in an angle to introduce the spray downwardly into opening 704. This is well known to those skilled in the art. Because of this positioning, a void 800 is formed between the fuel spray 1000 and the wall of the fuel injection body 700 which forms opening 704, the wall of emission control device 300 which forms through hole 304, and the wall of manifold 100 which forms through hole 104. Outlet 302c is located as close as possible to spray nozzle 710 and extends into through hole 304 far enough to generally bridge void 800 so that a very small portion of fuel spray 1000 impinges on it. Outlet 302c must extend into through hole 304 such that it does not block fuel spray 1000 but instead impinges thereon to the point where vaporization would occur. While the ends of outlet 302c can be squared as shown in previous embodiments, they instead could be "C" shaped as shown in FIG. 11b. Here the upper side edges 302d join the base of outlet 302c at a point further within through opening 304 than the center of the base of outlet 302c extends. Another way of saying this is that the end of outlet 302c would be concave in a top planar view. This is a particularly useful shape with a fuel injection adaptation as discussed now and is an end design which is applicable to all embodiments.

In FIGS. 12a, 12b, 12c, 13a, 13b, and 14, a further embodiment of the present invention is shown. This embodiment has been modified for use with small engines such as those used in motorcycles, lawn mowers, scooters and the like. Many of these engines are not large enough to include or have bolted therein the rectangular-like plate which serves to define through holes 304 and indentations of air passageways 302 and 306. As seen in these figures, outside communication bore 302a has been modified to extend outside of emission control device 300. This extension is neck 302a'. It is seen to extend horizontally and at right angles to the edge of emission control device 300. However, it could instead extend at an angle or an arc from this edge. It is of course hollow, being merely an extension of outside communication bore 302a. Rather than passing into section 302b, it instead directly communicates with outlet 302c, section 302b having been eliminated along with the rectangular plate in which it was defined. Outlet 302c still includes upper side lips 302d and lower full lip 302e. While the base of outlet 302c may continue to be generally horizontal or angle upwardly as noted above, it may in its joinder with outside communication bore 302a curve or bend downwardly or come from a side as long as at its outermost end, it returns to the horizontal or upwardly angled position. This is because the air flow must be straightened out as much as possible before it exits under the fuel passages. Further, the air flow must be directed toward the central axis + of the through opening 304 if it exists or toward the central axis of the opening 404 or 704 in the carburetor 400 or fuel injection body 700. One such curved or downward modification is shown by dotted lines in FIG. 12a. This modification would also be appropriate in the preceding embodiments. Those embodiments could also be modified to include a neck 302a' portion.

If the emission control device 300 is formed as an auxiliary device, then an opening is made in the carburetor 400 or fuel injector body 700 to place the emission control device 300 and specifically outlet 302c, below the fuel ports. Neck 302a' passes through this opening and snugly fits therein. The opening would of course be sealed around neck 302a' to prevent the intake of air from outside of the carburetor 400 or fuel injection body 700 other than through neck 302a'.

Figure 12A:
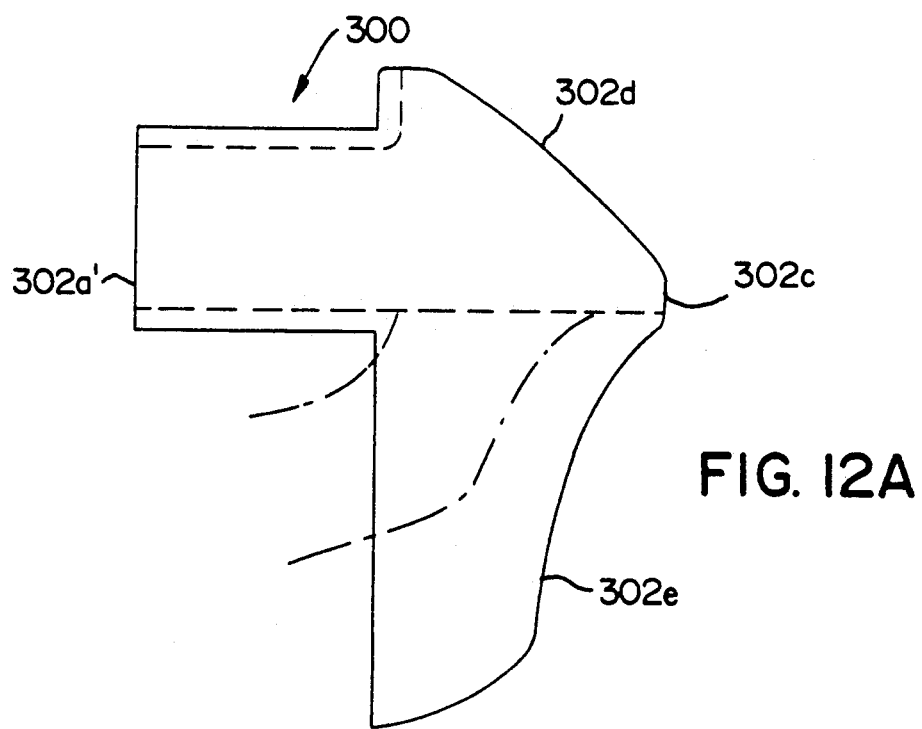
FIGS. 12a, 12b, and 12c are respectively a top, front, and sectional view of a modified version of FIG. 1 for use with small engines.
Figure 12B:
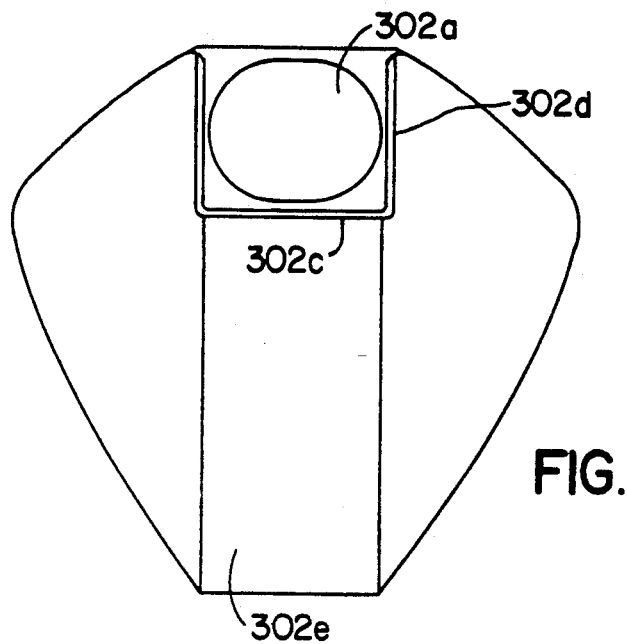
Figure 12C:
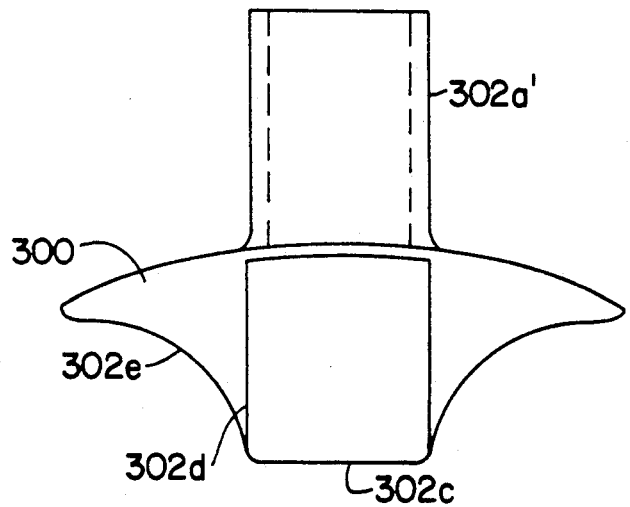
Figure 13A:
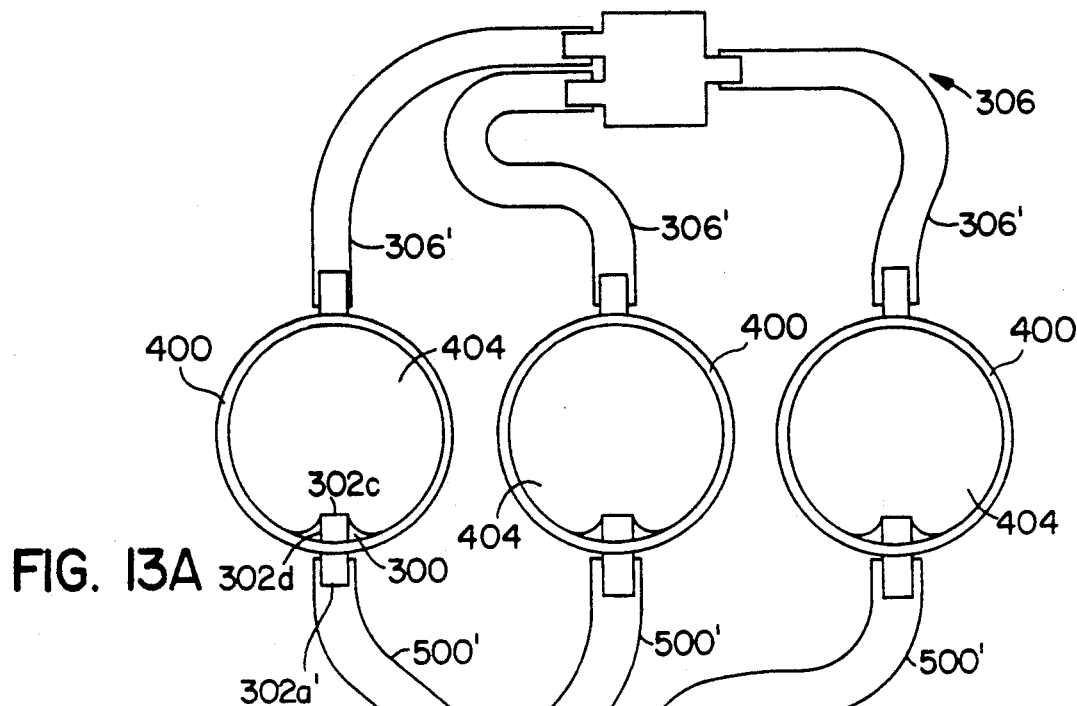
FIGS. 13a and 13b are a top planar view of FIG. 12 showing tubing used in lieu of a central indentation for an air passageway.
Figure 13B:
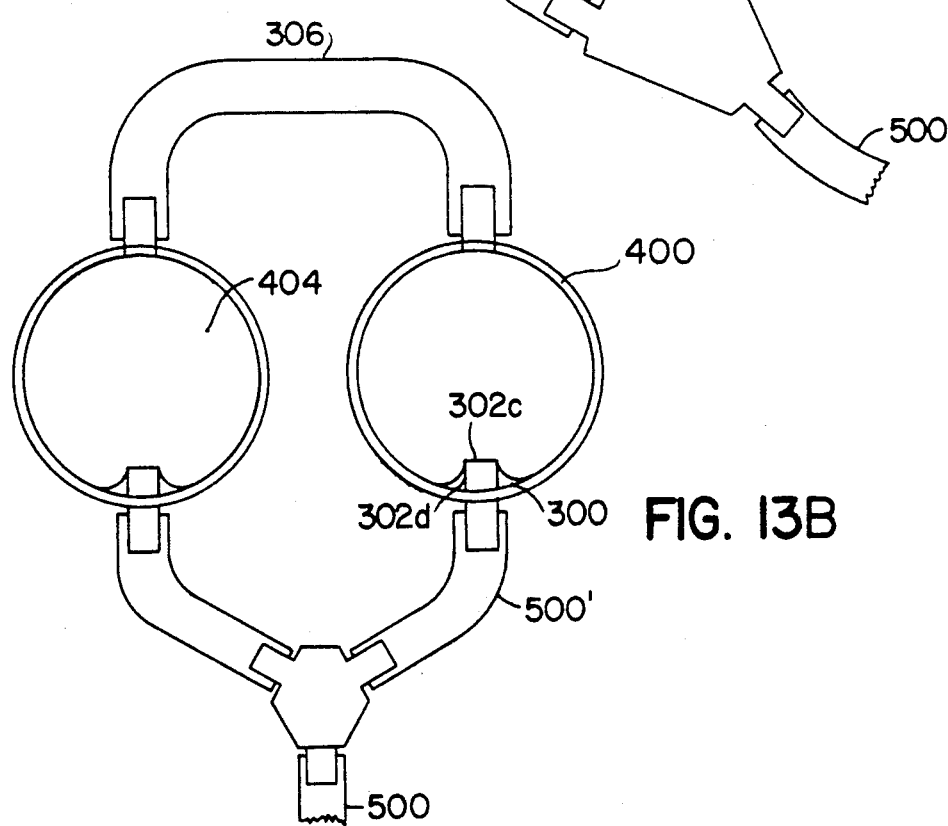

If a plurality of throttles are present, tube 306 replaces air passageway 306 in the earlier embodiments so that the air flow brought into the system by outlets 302c may pass in part through tubular air passageway 306. FIGS. 13a and 13b show this arrangement. In FIG. 13a the openings 404 of three carburetors 400 are present. Secured in each carburetor 400 is emission control device 300 as depicted in FIGS. 12a, 12b, and 12c. Outlet 302c, sidewalls, 302d, and the remainder of emission control device body 300 protrudes from the inside periphery of opening 304. Extending outside of carburetor 400 is neck 302a' which connects to line 500. Because line 500 must be split between three carburetors, it passes through a splitter device to form extensions 500' of equal length. Also extending from the outside of each carburetor 400 and communicating with each opening 404 is tube 306. Because tube 306 must communicate with three carburetor openings it is split into three sections of equal length 306'.

In FIG. 13b two carburetors 400 each having its own throttle are seen. In this instance, only one tube 306 is necessary. Although carburetors 400 are shown in FIGS. 12 through 13, fuel injection bodies might as well have been depicted.

It will be recalled that certain considerations must be made in deciding upon the depth of air passageway 306. Similar considerations must be made with respect to the diameter of tube 306. It is expected that a tube diameter in the range of 0.25 to 0.75 inches will provide optimum performance. This range may vary by 50% in either direction. In the instance where there are a number of carburetors 400 or fuel injection bodies 700, a plate containing all of the throttles could be manufactured, the emission control devices needed to operate with these throttles made integral with that unit. In such an instance, emission control device 300 would return to having air passageway 306 rather than tube 306.

In FIGS. 15, 16, 17, and 18, the embodiment of FIGS. 12 and 14 is formed with a sleeve or ring 900 to assist one in retrofitting motors. None of these embodiments are shown to include gaskets 200 or 200'. While gaskets are not necessary in these embodiments, some slight modification of manifold 100 may be necessary to make use of emission control device 300. Such modifications are readily appreciated by one skilled in the art and therefore not discussed herein.

In FIG. 15, emission control device 300 is connected to ring 900. Ring 900 is a generally cylindrical band whose width is generally equal to the height of emission control device 300. It is preferably formed with emission control device 300 and joins the device at or near the edge in which outside communication bore 302a is situated. Ends 901 of ring 900 are defined by an opening in ring 900. Ring 900 is preferably formed of a resilient plastic so that it can be compressed to reduce the diameter defined by it by bringing ends 901 toward one another or even past one another. Yet when released, the original diameter will be recovered. In other words, ring 900 must be capable of being elastically deformed. In use, ring 900 will be deformed to reduce its diameter, and then will be slipped within opening 404 of carburetor 400 or opening 704 of a fuel injection body, to pass neck 302a' through an opening formed therein. Thereafter, ring 900 will be released to recover its original diameter and thereby fit snugly within opening 404 or 704.

Figure 17:
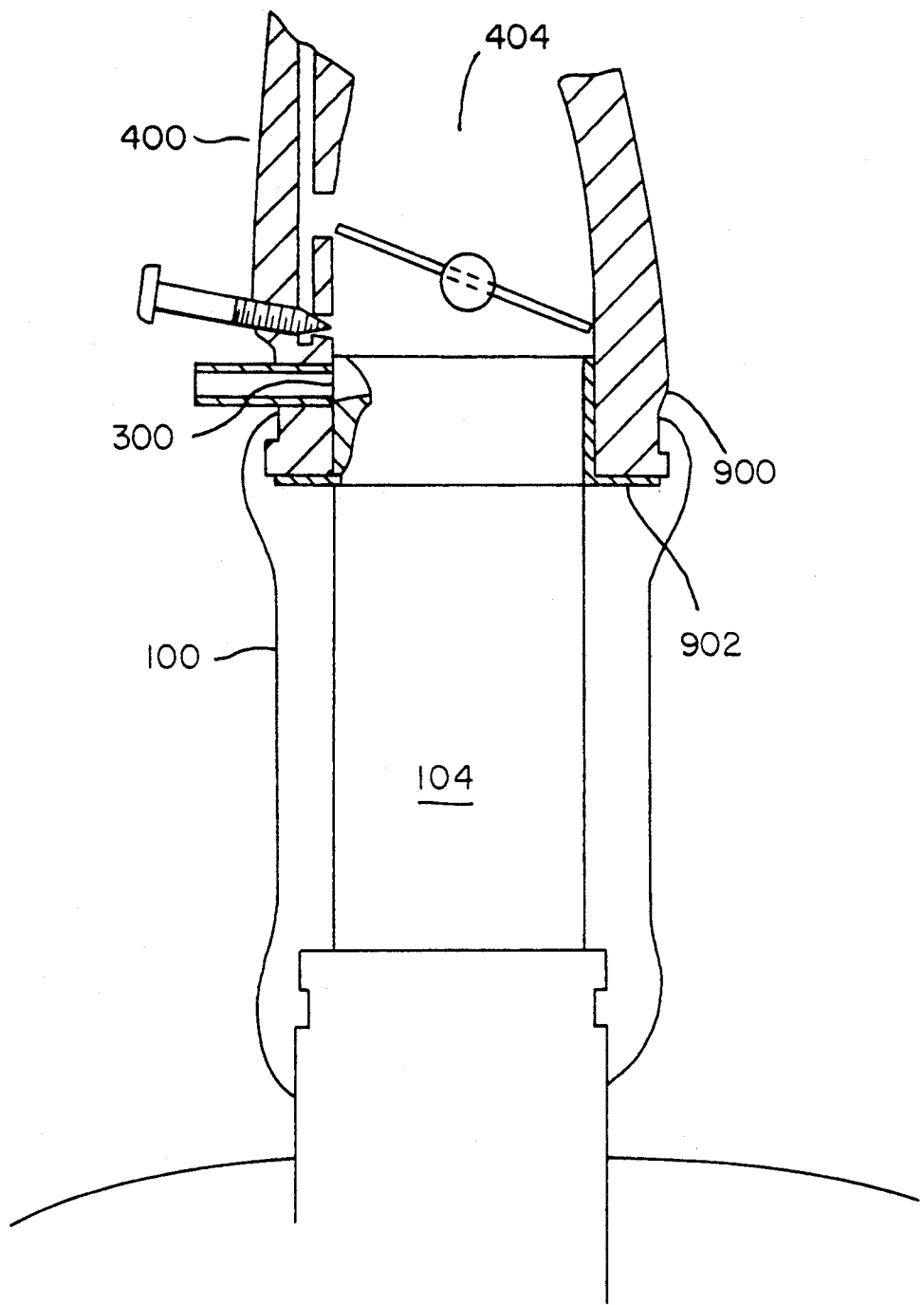
FIG. 17 shows the embodiment of FIG. 16 mounted in a carbureted engine.

FIG. 16 shows the ring or sleeve 900 to be an unbroken cylinder with a protruding rim 902. This embodiment is shown in FIG. 17, fitted into a carburetor 400 and manifold 100. Rim 902 lies generally at right angles to ring 900 and extends outwardly of the center thereof. In use, rim 902 is situated between manifold 100 and carburetor body 400. In the embodiment of FIG. 16, neck 302a' is detachably mounted to outer communication bore 302a. This enables ring 900 and emission control device 300 to be slipped into opening 404 and clamped there by the sandwiching of rim 902 between carburetor 400 and manifold 100. Thereafter, neck 302a' is placed in the opening formed in carburetor 400 as discussed above, and connected in known ways to outer communication bore 302a.

FIG. 18a is similar to FIG. 16 omitting however rim 902 and neck 302a'. Neck 302a' is deleted in this embodiment because this embodiment is designed for a carburetor or injector body which already has manufactured therein neck 302a'. Ring 900 is press fit or interference fit within carburetor opening 404. To do this, the inner surface of the carburetor or fuel injection opening 404, 704, is machined out to accommodate ring 900 so that outlet 302c is located under the fuel passages (the idle and mid-speed ports 408, 410 or the fuel injector nozzle 710) and in fluid communication with neck 302a'. FIG. 18b shows this arrangement.

Figure 19A:
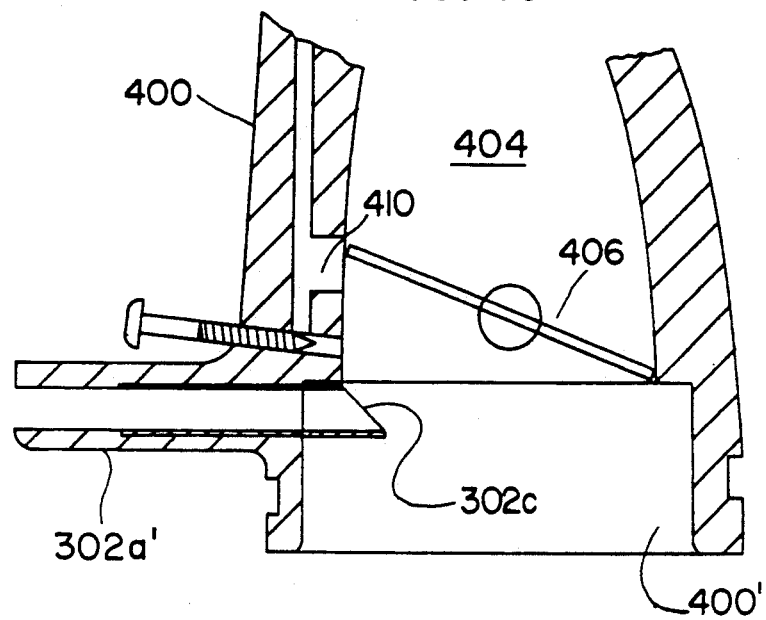
FIGS. 19a, 19b, and 19c show a carburetor or a small engine with the present invention made as part of that carburetor as well as enlarged views of the outlet of the invention.
Figure 19B:
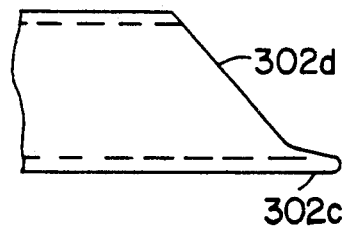
Figure 19C:
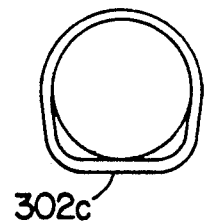

In FIG. 19a a small engine carburetor 400 is shown. This engine contains throttle 406, opening 404 in which throttle 406 is positioned and which is defined by the walls of carburetor 400, and idle and mid-speed fuel ports 408, 410 located at the side of throttle 406. This arrangement does not differ from that earlier described with respect to the carburetor 400 in FIG. 4. However, in this figure, carburetor 400 has been manufactured with the equivalent of the device of FIG. 12. That is the outside of the carburetor has been manufactured with a neck 302a' opening. The inside has been formed with a counterbore or groove 400' which widens opening 404. Inserted within the opening for neck 302a' is a pipe which at its end has been cut at an angle and crimped to provide the squared end of outlet 302c. FIGS. 19b and 19c provide the reader with a closer view of that end which has been formed to capture the design of outlet 302c and side edges 302d shown in previous embodiments. Lower full lip 302e is missing. Pipe end 302c lies below the idle and mid-speed fuel ports 408, 410 and throttle 406 again as described with respect to FIG. 4. All of the foregoing embodiments can be readily adapted for use with fuel injectors.

Figure 20:
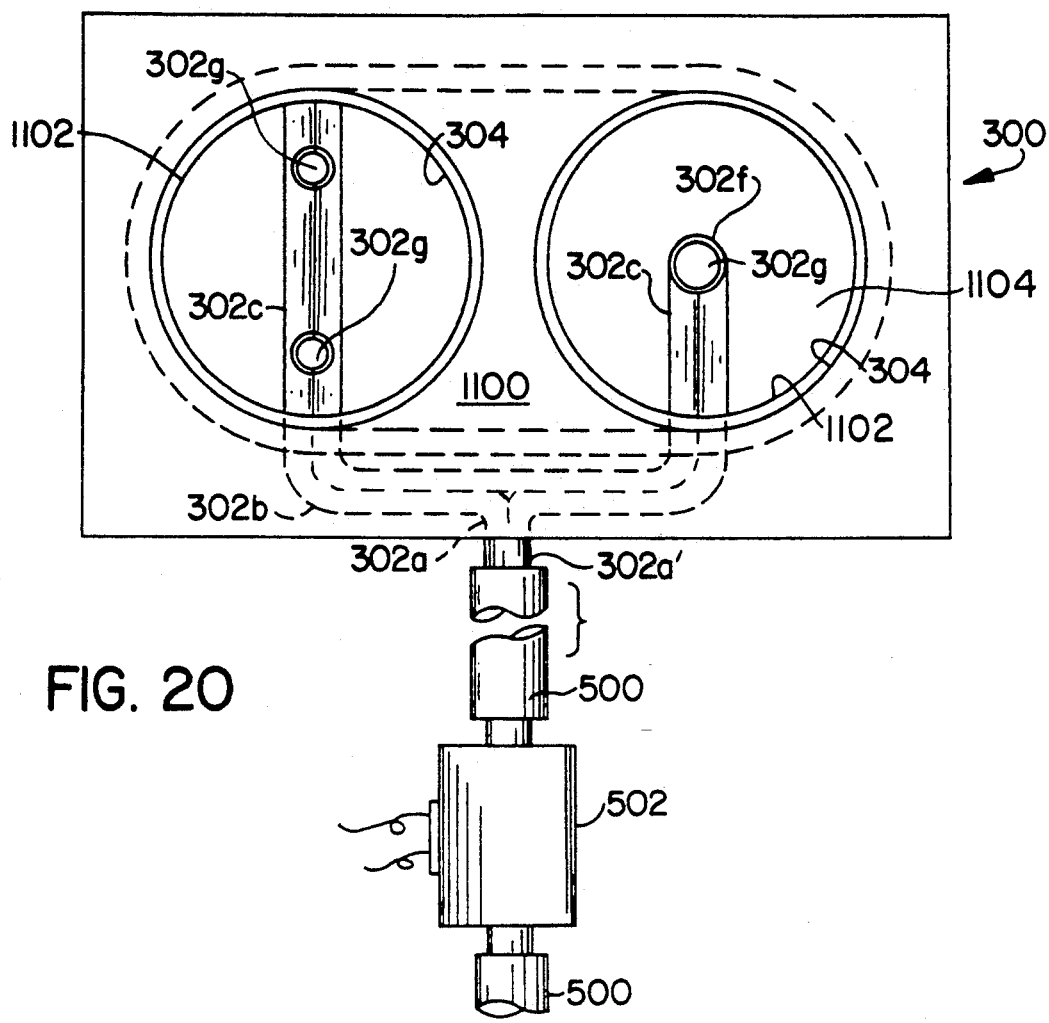
FIGS. 20a and 20b show a top view of a further embodiment of the present invention for use in a throttle body fuel injection system and connected to a controller.

In FIGS. 20a and 20b through 22, the final embodiments of the present invention are shown. These embodiments are shown used in throttle body fuel injection engines but could instead be used with carburetors. FIG. 20 contains an emission control device somewhat similar to that shown in FIG. 2. It differs in several respects now noted. Outside communication bore 302a is again defined in the edge of emission control device 300. It, like that discussed with respect to FIG. 12, extends beyond the edge of emission control device 300 to define neck 302a' which attaches to air filter line 500. While outside communication bore 302a is defined within the body of emission control device 300 until it surfaces into section 302b of air passageway 302, section 302b is now defined in the underside of emission control device 300 and is therefore, shown in dashed lines in FIG. 20. This relationship is more clearly depicted in FIG. 21 which is a side sectional view through air passageway 302. As can be seen in that figure, section 302b is still an indentation in the surface of the body of emission control device 300, but now it is in the bottom surface of the device. Also of note is that outlet 302c, while in fluid communication with section 302b, is no longer defined in the surface of emission control device but is a conduit leading from section 302b through the body of emission control device 300 into the center or near center of through opening 304. As a conduit, outlet 302c is situated closer to the bottom surface and generally parallel thereto, than to the top surface of emission control device 300. The endmost point of outlet 302c is no longer squared and open from which upper side lips 302d and lower full lip 302e extend, but is sealed by an end wall 302f which is generally perpendicular to the base of outlet 302c. Further, outlet 302c as a conduit is fully closed except for an end top opening 302g seen in FIGS. 20a, 20b and 21. It is of note that in FIG. 20a only the righthand through opening 304 shows outlet 302c with opening 302g at the top of outlet 302c and near end wall 302f. In the left hand through opening 304, outlet 302c is seen to extend across the entire diameter of and bisect through opening 304 even though it is still generally centrally or near centrally located. In this lengthened version, outlet 302c contains two top holes 302g symmetrically spaced with respect to the circumference of through opening 304. This left hand modification is to show an alternative embodiment of outlet 302c, used when the throttle is particularly large. In a high performance engine, outlet 302c would be as shown in the left hand side of through opening 304 of FIG. 20, but it would be placed to bisect through opening 304 and lie parallel to or in line with the major axis of the emission control device 300. This is shown by FIG. 20b and the slight modification made to section 302b so that it enters the sides of openings 300 to accommodate this change is shown in dotted lines. Accordingly, it is to be understood that unless the throttles 406 under which outlets 302c extend differ, outlets 302c will be uniform in shape in each emission control device 300.

Figure 21:
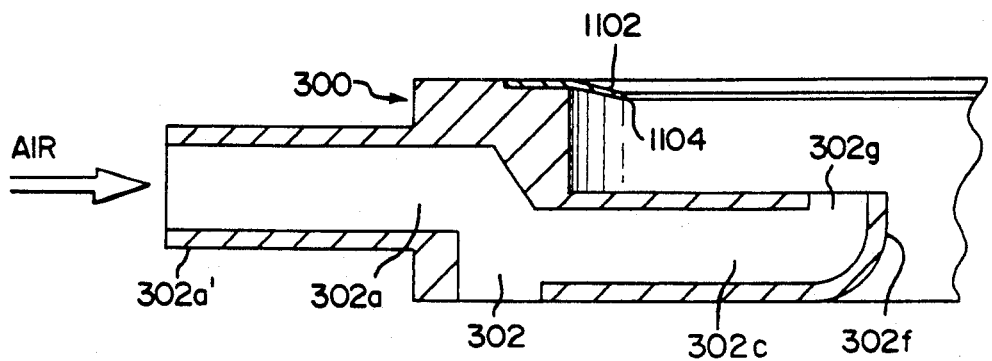
FIG. 21 is a sectional view of the device of FIG. 20 without the controller installed in a throttle body fuel injection engine.

Outlet 302c can be tubular, rectangular or square in shape. It is however, preferably generally triangular in shape with its apex nearest the top surface of emission control device 300 and its base nearest the bottom surface of emission control device 300. This is seen in FIG. 21. In a generally triangular configuration sharp angles and abrupt edges are softened with curved or tapered edges.

On the top surface of emission control device 300, in an indentation therein, is metal plate 1100. Metal plate 1100 is generally rectangular in shape so that it extends completely over air passageway 306 and through openings 304. Since it rests in an indentation in the upper surface of emission control device 300, emission control device has a smooth upper surface when combined with metal plate 1100. Metal plate 1100 also defines through openings 1104 in its surface. These lie on top of and register with through openings 304 in emission control device 300 when metal plate 1100 is placed in the upper surface of emission control device 300. Through openings 1104 are of a smaller diameter than through openings 304 to create circumferential overhang 1102 seen in FIGS. 20a, 20b, 21, and 22. Circumferential overhang 1102 bends into through openings 304 of emission control device.

Figure 22:
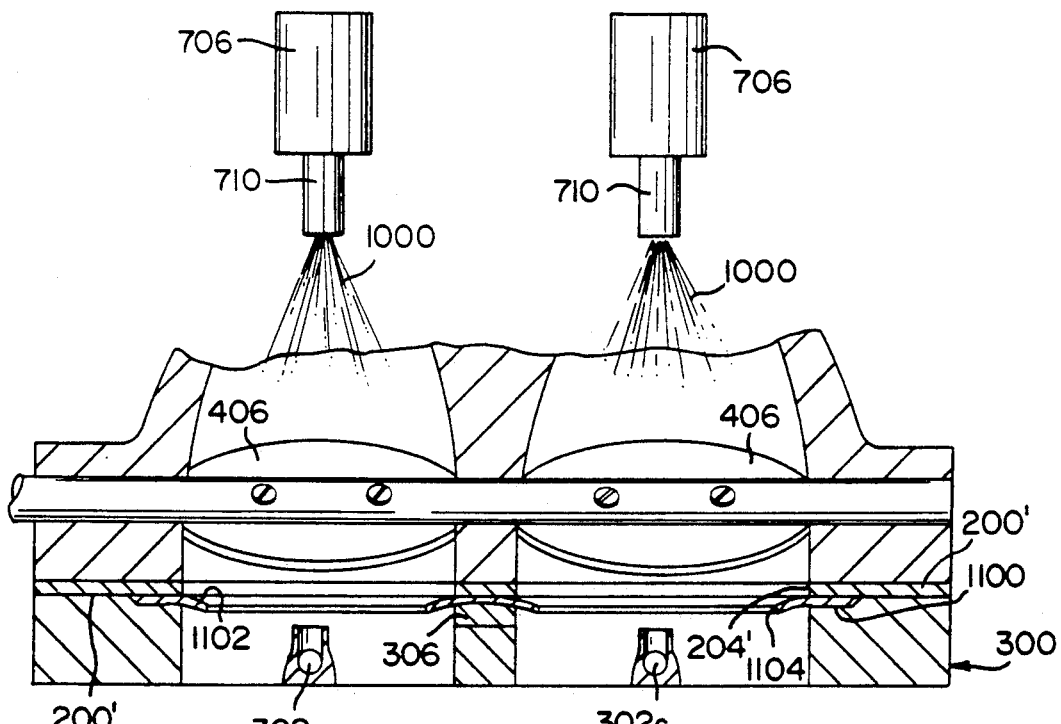
FIG. 22 is a side sectional view of a portion of the air passageways of the invention.

FIG. 22 nicely depicts the arrangement of emission control device 300 of FIG. 20 with respect to a fuel injection engine. Fuel injector body 700 contains an opening 704 of lesser diameter than opening 304 of emission control device 300. Fuel injector 706 with nozzle 710, and fuel spray 1000 emitting therefrom is within opening 704. Fuel injector 706 extends along the longitudinal axis of fuel injector body 700 and fully within opening 704 so that fuel spray 1000 is directed vertically and downwardly onto throttle 406 which lies below it. This arrangement is well known in the art. Below throttle 406 is second gasket 200' whose through openings 204' are of a diameter smaller than or as large as through openings 304. In the throttle body case, it is preferred that openings 204' be as large as through openings 304 so that through openings 204' in no way interfere with the circumferential overhang 1102. Circumferential overhang 1102 extends beyond the walls of both through openings 204' and 304 by about 0.075 to 0.175 of an inch.

Underneath second gasket 200' is metal plate 1100 and then emission control device 300. Outlet 302c is seen to be centrally or near centrally located with respect to the width of throttle 406. That metal plate 1100 sits within an indentation in the upper surface of emission control device 300 is well seen in this figure.

In operation, fuel is sprayed out of nozzle 710 of fuel injector 706 onto throttle 406 to splash against the side walls and into through openings 204', 1104, and 304. That fuel which is caught by the walls of opening 704, drips onto circumferential overhang 1102 and then is delivered into through opening 304. This maximizes fuel usage by catching and delivering the fuel which would normally drip down the side walls, into the through opening 304 where it can be mixed with air emitted from outlet opening 302g. Thus, the fuel which would slide down the walls defining openings 704, 204', 104, is instead directed by circumferential overhang 1102 into the air flow. This maximizes vaporization of fuel.

An amendment to the foregoing embodiment in FIGS. 20a, 20b, 21 and 22, would be to include a plurality of outlets 302c spaced about the circumference of through opening 304 and preferably extending into through opening 304 at least as far as circumferential overhang 1102.

It is of note that neck 302a' discussed in the preceding figures is an optional feature.

Figure 20A:
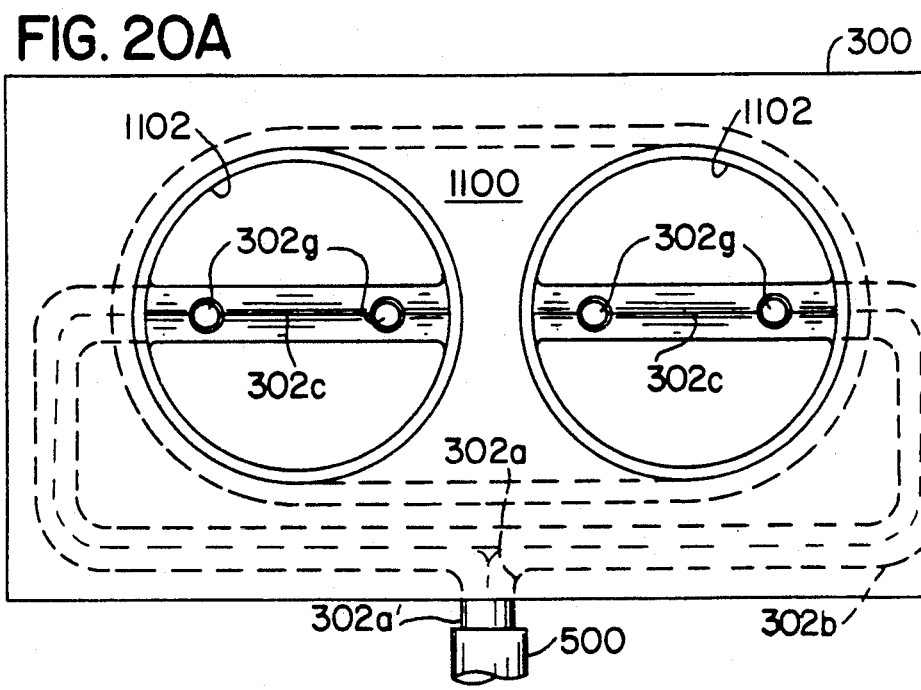

While section 302b is shown in the base of emission control device 300 in FIGS. 20a, 20b, and 21, it could instead be placed in the top surface. However, since outlet 302c extends closer to the bottom surface, placing section 302b in the top surface would unduly weaken emission control device 300. In all embodiments, emission control device 300 is a relatively thin plate, in the range of 5/16 to ½ of an inch.

Returning to FIG. 20a, controller valve 502 connects between either a portion of line 500 or a separate connecting hose 500 which attaches at its other end to emission control device 300. Controller valve 502 may be added to any of the foregoing embodiments in the same fashion and replaces valve 502 as seen in FIG. 1. It is used to vary the air flow. When the gas peddle is first depressed in a vehicle, there is a drop in vacuum. It appears that when first accelerating, for a very short period of time, varying or reducing the air flow causes the carbon monoxide emissions to decrease. Thus it was found that by varying or reducing air flow at appropriate times, toxic emissions could be even further reduced with the present invention. Controller valve 502 would attend to this varying or reducing of air flow although it could as well be used to maximize air flow. This is significant during speed changes while driving and in view of surrounding temperatures. As an example of this latter point, in extremely cold climates, the amount of air allowed to pass into outside communication bore 302a may be reduced by control valve 502 by 50% or more upon starting of an engine. It may then be increased up to 75% or 85% as the engine warms up. The technology to make control valve 502 operate in the above described fashion is known in the art.

The present invention is claimed as follows:

1. An emission control device for use with a carburetor having a base defining therein at least one opening and a fuel port opening into said at least one opening, said device comprising:

a body member of predetermined thickness, said body member having a surface and at least one through opening extending therethrough, said through opening communicating with said at least one opening in said base; and an air passageway defined in said surface to form an open indentation therein, said air passageway opening into said through opening and forming a lip that extends beyond said body member into said through opening, said air passageway lying generally adjacent to said base of said carburetor and said fuel port so that air passing through said air passageway passes into said through opening essentially directly under said fuel port, said air first entering said through opening by means of said lip such that fuel exiting from said fuel port is essentially immediately mixed with the air passing through said air passageway and said lip, said lip being directed toward the central longitudinal axis of said through opening, said lip being comprised of an end, a base joining said end to said body member, and two opposing sides connected to said base, said sides generally decreasing in height as they extend from the walls which define said through opening to said end.

2. The emission control device of claim 1 wherein said air passageway extends into said through opening so that said end of said lip is at least in line with the sides of said carburetor that define said at least one opening in said base of said carburetor.

3. The emission control device of claim 2 wherein said through opening has a larger diameter than said at least one opening defined in said base of said carburetor such that a ledge is formed between said at least one opening in said base of said carburetor and said through opening.

4. The emission control device of claim 1 wherein said lip has the smallest cross sectional area of said air passageway.

5. The emission control device of claim 1 wherein as said air passageway enters said through opening it forms a venturi.

6. The emission control device of claim 1 wherein said sides in side view are generally triangular in shape with the apex of the triangle joining the end of said lip.

7. The emission control device of claim 1 wherein the only vacuum drop which occurs during air passage through the air passageway defined in the device is at that end which passes into said through opening.

8. The emission control device of claim 1 wherein there are two through openings in said device and wherein lying between said two through openings is a second passageway in fluid communication with said two through openings, said second passageway being defined in the same surface of said device as said air passageways, said second passageway being an indentation in said surface, wherein air passing in said air passageway to said two through openings passes through said second passage way.

9. The emission control device of claim 8, wherein said air passageway is comprised of a bore within the side of said emission control device and said indentation being on the lower surface of said emission control device, said bore opening into said indentation, said indentation opening and extending at one point into each of said two through openings and in each instance angling toward the central axis of each of said through openings, said bore being symmetrically arranged with respect to the central axes of said through openings.

10. The device of claim 9 wherein each of said indentations passes into said through openings by means of a tubular outlet which opens at its top near the top of said emission control device.

11. The emission control device of claim 8 wherein said air passageway has a second end, said second end connecting to an air source, each lip being equidistant from the point where said air passageway connects to said air source and the center of said air passageway.

12. The emission control device of claim 11 wherein said end of said lip is curved such that the mid point of each end extends into said through opening more than the sides of each end.

13. The emission control device of claim 11 wherein said end of said lip is square.

14. A carburetor or fuel injection body having a base defining an opening of a first width; a fuel port in fluid communication with said opening; and an emission control device located at said base, said device comprising at least one through opening of a second width, said second width being greater than said first width, said through opening communicating with said opening in said carburetor or fuel injection body, said emission control device also having an air passageway of generally constant dimension, said air passageway communicating with and extending into said second opening to define an extending lip in said second opening, said lip being of smaller dimension than said air passageway, the dimension of said air passageway gradually changing to the dimension of said lip.

15. The emission control device of claim 14 wherein said air passageway is positioned to open into said through opening at a point which maximizes the burning of the fuel pouring from said fuel port.

16. An emission control device comprising a body; a singular open port extending from one side of said body, and a singular tubular port extending from the opposing side of said body, said tubular port being in direct fluid communication with said open port said device including a band extending therefrom with enable said body to be fit within the opening of a carburetor or fuel injection body in which the fuel port empties.

17. A carburetor or fuel injection body having a base defining an opening of a first width; a fuel port in fluid communication with said opening; said body or said carburetor having at said base an emission control device comprised of a body and a metal plate, said body comprising: at least one through opening of a second width, said second width being greater than said first width, said through opening communicating with said opening in said body; an air passageway, said air passageway communicating with said second opening and opening into said second opening under said fuel port; said metal plate defining at least one opening therein, said opening being smaller than that of either of said first or second opening, said plate being placed between said carburetor or fuel injection body and said device to form a circumferential overhang around the periphery of said second opening to cause fuel emitted from said fuel port to drip thereoff into said second opening to be mixed with the air therein.

18. The device of claim 17 wherein said plate fits within an indentation formed in the top of said emission control device such that with said plate, the top of said emission control device is generally flat.

19. The device of claim 17, wherein said overhang arcs downwardly into said through openings.

20. An emission control device comprised of a tubular portion for connection to an air supply source at one end and for extending under the fuel ports in a carburetor or fuel injector body opening at the other end and under or into the fuel injector or carburetor opening in which said fuel ports empty, said other end being an outlet cut at an angle, said outlet having a base portion and a top portion, the base portion of said outlet extending further under or into said body opening than the top portion of said outlet.

21. An emission control device comprising a body; a singular open port extending from one side of said body; and a singular tubular port extending from the opposing side of said body, said ports being in direct fluid communication with each other, said open port extending such that when said device is used with a carburetor or fuel injection body said port extends below or within the opening defined in said body where said fuel port is located in said carburetor or fuel injection body, said port being situated essentially directly under said fuel port, wherein there are a plurality of said devices, said plurality sharing a common air passageway, each of said tubular ports carrying a portion of air transferred from said common air passageway into each of said tubular ports and thereby into each of said open ports, said passageway thereby being indirectly in fluid communication with said open ports.

22. The emission control device of claim 13 wherein said open port has a base and two sides, the sides appearing in side view like a triangle, the apex of the triangle joining the base of the port, the base of the triangle being adjacent the tubular port.

23. The emission control device of claim 22 further comprising a lower lip extending from and below the base of said open port, said lower lip angling away from the end of said open port toward said tubular port.

24. The device of claim 23 wherein the end of said open port is square.

25. The device of claim 13 wherein each of said tubular ports is equal in length.

26. The device of claim 25 wherein the end of said open port is curved.

27. The device of claim 21 wherein the diameter of said tubular port is between 0.25 and 0.75 inches.

* * * * *